US012145119B2

(12) United States Patent
Günther et al.

(10) Patent No.: US 12,145,119 B2
(45) Date of Patent: Nov. 19, 2024

(54) MIXING DEVICE WITH CLOSURE ELEMENT

(71) Applicant: Maschinenfabrik Gustav Eirich GmbH & Co. KG, Hardheim (DE)

(72) Inventors: Timo Günther, Walldürn (DE); Christian Ott, Ahorn-Eubigheim (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 797 days.

(21) Appl. No.: 16/980,134

(22) PCT Filed: Mar. 8, 2019

(86) PCT No.: PCT/EP2019/055838
§ 371 (c)(1),
(2) Date: Sep. 11, 2020

(87) PCT Pub. No.: WO2019/175048
PCT Pub. Date: Sep. 19, 2019

(65) Prior Publication Data

US 2021/0008516 A1 Jan. 14, 2021

(30) Foreign Application Priority Data

Mar. 16, 2018 (DE) ..................... 10 2018 106 187.0

(51) Int. Cl.
*B01F 35/75* (2022.01)
*B01F 29/83* (2022.01)
*B01F 35/45* (2022.01)

(52) U.S. Cl.
CPC .......... *B01F 35/751* (2022.01); *B01F 29/835* (2022.01); *B01F 35/451* (2022.01)

(58) Field of Classification Search
CPC ..... B01F 35/751; B01F 35/451; B01F 29/835
(Continued)

(56) References Cited

U.S. PATENT DOCUMENTS 3,434,697 A 3/1969 Carlson et al.
4,854,715 A * 8/1989 Eirich .................... B01F 29/83 366/94
(Continued)

FOREIGN PATENT DOCUMENTS

CN 1658960 A 8/2005
CN 102869435 A 1/2013
(Continued)

OTHER PUBLICATIONS

Office Action issued in related Chinese patent application No. 201980019848.X dated Dec. 15, 2021.
(Continued)

*Primary Examiner* — Marc C Howell
(74) *Attorney, Agent, or Firm* — Faegre Drinker Biddle & Reath LLP

(57) ABSTRACT

Mixing device having a container rotatable about container axis, with emptying opening being arranged in the bottom thereof, rotatable mixing tool arranged in the interior of the container, and closure element for closing the emptying opening. The closure element can be pivoted about a pivot axis for opening and closing the emptying opening. With the emptying opening closed, the closure element has inner surface arranged within the container, outer surface arranged outside the container, and edge surface arranged opposite an edge surface of the emptying opening. The closure element, emptying opening and pivot axis are of such a configuration and arrangement that a point arranged furthest away from the pivot axis on the inner surface or the edge surface describes a circle in the pivotal movement, wherein the closure element is arranged within the circle and the edge surfaces of the emptying opening are arranged outside the circle.

6 Claims, 3 Drawing Sheets

(58) Field of Classification Search
USPC .......................................................... 366/220
See application file for complete search history.

(56) References Cited

U.S. PATENT DOCUMENTS

| | | | | |
|---|---|---|---|---|
| 6,669,360 | B1 * | 12/2003 | Adelmann | .............. F16K 27/07 366/347 |
| 2005/0173311 | A1 | 8/2005 | Turnbull | |
| 2011/0249527 | A1 | 10/2011 | Seiler et al. | |
| 2013/0016581 | A1 | 1/2013 | Doerr et al. | |
| 2019/0126225 | A1 | 5/2019 | Bok et al. | |

FOREIGN PATENT DOCUMENTS

| | | | | |
|---|---|---|---|---|
| CN | 105964182 | A | 9/2016 | |
| CN | 106000168 | A | 10/2016 | |
| DE | 12 96 609 | B | 6/1969 | |
| DE | 38 38 043 | A1 | 5/1990 | |
| DE | 20 2006 003390 | U1 | 7/2006 | |
| DE | 10 2009 044 205 | A1 | 5/2010 | |
| DE | 202013100812 | U1 * | 7/2014 | ........ B01F 15/00032 |
| GB | 1 114 175 | A | 5/1968 | |
| JP | 2001-157832 | A | 6/2001 | |
| KR | 10-1754214 | B1 | 7/2017 | |
| RU | 2476260 | C1 | 2/2013 | |
| RU | 2521571 | C2 | 6/2014 | |
| SU | 77376 | A1 | 11/1949 | |
| WO | WO-2011/128435 | A1 | 10/2011 | |

OTHER PUBLICATIONS

KR Office Action Mailed on Feb. 16, 2023 for KR Application No. 10-2020-7029564, 10 page(s).

* cited by examiner

MIXING DEVICE WITH CLOSURE ELEMENT

CROSS-REFERENCE TO PRIOR APPLICATIONS

This application is a § 371 National Stage Application of PCT International Application No. PCT/EP2019/055838 filed Mar. 8, 2019, which claims priority to German Application No. 10 2018 106 187.0 filed on Mar. 16, 2018, both of which are incorporated herein in their entirety.

The present invention concerns a mixing device having a container rotatable about a container axis for receiving mixing material, with an emptying opening being arranged in the bottom thereof, a rotatable mixing tool arranged in the interior of the container, and a closure element for closing the emptying opening, wherein the closure element can be pivoted about a pivot axis for opening and closing the emptying opening, wherein the closure element has an inner surface which with the emptying opening closed is arranged within the container, an outer surface which with the emptying opening closed is arranged outside the container, and an edge surface which with the emptying opening closed is arranged opposite an edge surface of the emptying opening.

Frequently such a closure element is in the form of a closure cover. That however is not absolutely necessary. The closure element could also be an element separate from the closure cover. Hereinafter the invention is described with reference to closure elements in the form of a closure cover. It will be appreciated however that, instead of a closure cover, it is also possible to design a closure cover in accordance with the invention, even if the configuration thereof in the form of a closure cover is preferred.

Such a mixing device is known for example from WO 2011/128435 A1.

A known mixing device of that kind is shown in FIGS. 1 and 2. Therein FIG. 1 shows a plan view of a mixing container. FIG. 2 shows a sectional view.

The cylindrical mixing container 1 has a mixing tool 2 which is arranged eccentrically in the mixing container and which is mounted in overhung relationship, on a central shaft 3, with laterally arranged mixing blades 4 and a stationary wall/bottom scraper 5 mounted in overhung relationship vertically from above. Fixed to the lowermost blade plane of the mixing tool 2 are vertically downwardly projecting bottom blades 6 which operate at a small spacing relative to the surface of the container bottom.

The emptying opening 7 is disposed in the centre of the mixing container 1. The emptying opening 7 can be closed with a closure element in the form of a closure cover 8. In the illustrated embodiment the closure cover 8 is connected to a support arm 10 by way of a mounting fork and the mounting trunnion 9 and is thus pivotable about the pivot axis of the mounting trunnion 9. The support arm 10 is mounted rotatably by way of the pivot shaft 11. A return element (not shown) provides that the closure cover 8 assumes a given position relative to the support arm 10 if there are no external forces acting thereon.

When the emptying opening 7 is closed, that is to say the closure cover 8 is positioned within the emptying opening 7, the closure cover 8 ends flush with the bottom of the container. That forms a flat bottom surface, on which the mixing material is moved. That ensures efficient thorough mixing of all the material to be mixed, as above the closure cover there is no dead space which is not reached by the bottom blades 6.

The requirement for the closure cover to end flush with the container bottom gives rise to difficulty in terms of the configuration and guidance of the closure cover.

Basically the closure cover would have to be moved linearly downwardly to open the emptying opening. The consequence of that however would be that, by virtue of the arrangement of the emptying opening in the bottom of the container, the mixing material would flow over all known surfaces of the closure cover and would possibly even foul the drive of the closure cover. It is however not possible for the closure cover to be pivoted laterally out of the emptying opening by virtue of the substantially cylindrical or frustoconical contact surfaces of the closure cover and the emptying opening.

For that reason the drive of the closure cover that is shown in FIG. 2 allows a pivotal movement both about the axis 11 and also about the axis 9. The known closure cover is complicated and expensive to manufacture and cannot be readily cleaned. By virtue of the rotational movement of the closure cover the closure cover has to have a certain clearance within the emptying opening to be able to be pivoted out of the emptying opening. The gap which is formed as a result means that mixing material constituents can escape from the container even when the emptying opening is closed. In addition the closure cover has to be very thoroughly cleaned after each emptying operation in order to ensure that it can be positioned in the opening again and reliably seals it off. In addition mixing material can collect in the region of the pivot axis 9 which is beneath the closure cover, and impede the pivotal operation. By virtue of the pivotal movement of the closure cover in conjunction with the rotary movement of the mixing container the mixing material as it flows out of the opening will flow out of the mixing container in a parabolic path. As a result it is necessary for the transfer box 12 which is disposed beneath the closure cover to be of a relatively large size, which causes difficulty with subsequent cleaning. In addition the lower discharge cross-section of the transfer box has to be made relatively large to permit a sufficiently steep discharge angle. The large discharge cross-section causes difficulty in terms of receiving the mixing material in downstream-connected containers as they too in turn have to involve large inlet cross-sections.

The object of the present invention therefore is to provide a mixing device of the kind set forth in the opening part of this specification, which at least reduces the above-described disadvantages and permits transfer of the mixing material over a comparatively small cross-section.

According to the invention that object is attained in that that the closure element, the emptying opening and the pivot axis are of such a configuration and arrangement that a point arranged furthest away from the pivot axis on the inner surface or the edge surface of the closure element describes a circle in the pivotal movement, wherein the closure element is arranged within the circle and the edge surfaces of the emptying opening are arranged outside the circle.

By virtue of that measure, the closure element only has to be rotated about the pivot axis in order to close the emptying opening. The emptying opening is of such a configuration and arrangement that the edge surface of the emptying opening cannot collide with the closure element during the pivotal movement.

In principle a gap can remain between the edge surfaces of the closure element and the edge surfaces of the emptying opening even in the closed position of the closure element within the emptying opening, the gap width however should be less than the smallest grain size of the mixing material to be processed, to prevent the mixing material from flowing out of the mixing container in the closed position of the closure element.

A preferred embodiment provides that the emptying opening and the closure element have mutually corresponding edge surfaces which come into contact with each other when the closure element is positioned in the emptying opening.

That measure ensures that no gap remains between the emptying opening and the closure element in the closed position of the closure element.

A further preferred embodiment provides that the edge surfaces of the closure element are of a curved configuration such that they lie on a notional sphere and the centre point of the notional sphere lies on the pivot axis.

Particularly preferably the closure element ends flush with the bottom so that a flat bottom surface is afforded when the closure element is positioned in the emptying opening.

Such a configuration of the edge surfaces is similar to the structure of spherical segment slides. Spherical segment slides serve as a shut-off member within dosing and feed lines. It will be noted however that in the case of the spherical segment slides the movable valve slides are of a spherical segment shape, that is to say not only the contact surfaces which come into contact with a corresponding valve seat are of a curved configuration, but the entire valve slide is in the shape of a spherical cap. Apart from the fact that such a valve slide is not to be viewed as a closure cover, it also does not permit an arrangement in the container bottom in the plane thereof, by virtue of the cap shape.

The configuration according to the invention has the advantage that the closure cover can be easily pivoted about the pivot axis to close or open the emptying opening.

In a preferred embodiment the mixing tool has a mixer shaft arranged parallel to the axis of rotation of the container and a plurality of blades spaced from each other along the mixer shaft. Thorough mixing of the mixing material can be substantially speeded up by means of such a mixing tool. Such a mixing tool is already shown in FIGS. 1 and 2. Alternatively, in place of the mixing blades, it is also possible to use disc-shaped mixing tools with for example v-shaped or u-shaped recesses at the outer periphery and pins or bar-shaped mixing elements projecting upwardly or downwardly out of the plane of the mixing tool. To achieve mixing of the mixing material which is as completely thorough as possible it is necessary, with all mixing tool geometries, to arrange at the end towards the bottom, at least one and preferably at least two generally mutually oppositely disposed bottom blades which, at a small spacing relative to the mixing container bottom or also with direct contact therewith, remove accumulations of material on the mixing container bottom and the closure cover, by virtue of the rotary movement. The bottom blades are usually arranged in such a way that they pass over the axis of rotation of the mixing container and also the closure cover.

It will be seen that the blades of the mixing tool with the bottom blades 6 fixed thereto extend over the closure cover. As can be seen in particular from FIG. 2 therefore the situation can arise in which a blade of the mixing tool or a bottom blade fixed to the mixing tool blade is arranged directly above the closure cover. As according to the invention the closure cover is pivoted about a pivot axis to open and close the emptying opening and as the centre point of the curvature of the edge surfaces of the closure cover lies on that pivot axis, in a pivotal movement of the closure cover about the pivot axis, the edge surfaces move along the surface of the notional sphere, that is to say they move on a circular path. The consequence of this however is that the edge surfaces are pivoted into the container, which however can result in collision of the closure cover with the mixing tool blade or the bottom blade mounted to the mixing tool blade, when it is precisely in the region of pivotal movement of the closure cover. It is therefore necessary that, before opening or closing of the closure cover, the mixer shaft is rotated in such a way that no mixing tool blade and no bottom blade is in the region of the pivotal movement of the closure cover. That can be implemented for example manually, that is to say by an operator present on site.

In a preferred embodiment the mixing device has a positioning device for rotational positioning of the blades of the mixing tool and in particular the bottom blade relative to the emptying opening.

The mixing tool can then be placed by means of the positioning device in such a way that the parts of the mixing tool which could collide with the closure cover, that is to say in particular the bottom blades, are not in the region in which the closure cover performs its pivotal movement upon opening thereof.

With the device according to the invention therefore, before the closure cover which is in the form of a spherical segment valve, is opened or closed, the mixing shaft is firstly moved by means of the positioning device into a position in which the closure cover can be pivoted without any risk. In that respect it is to be ensured that, during the pivotal movement, the parts of the mixer shaft, that could collide with the closure cover, are not moved into the region of the pivotal movement of the closure cover.

In a preferred embodiment the positioning device has a device for determining the rotational position of the mixer shaft. Depending on the respective drive of the mixer shaft it may not be possible to predict, in what position the mixing tool or the projecting elements or bottom blades on the mixer shaft are disposed at the time. A positioning device can therefore be helpful, to determine the current rotational position of the mixer shaft, in which respect on the basis of determining the position in that way, the positioning device can implement rotational positioning of the bottom blades of the mixing tool relative to the emptying opening to permit harmless pivotal movement of the closure cover.

In principle any desired sensor can be used for determining the rotational position. Particularly preferably arranged on the mixer shaft or on drive elements fixed thereto, like for example V-belt pulleys, are cams which are sensed with corresponding cam followers co-operating with the cams so that mechanical, electrical or electromechanical detection is effected. By way of example a cam-shaped raised portion can be arranged on the mixer shaft (or on a V-belt pulley fixed thereto), the cam-shaped portion being positioned in such a way that, when the stationarily positioned cam follower detects the cam-shaped raised portion, this ensures that the mixer shaft is in a position in which no bottom blade of the mixer shaft is in the region of the pivotal movement of the closure cover.

As long as the cam follower is detecting the cam therefore the closure cover can be opened or closed. If the cam follower is not detecting the cam then the mixer shaft must be rotated further until the cam is detected. In principle it is also possible for the cams to be arranged on the mixer shaft in such a way that, when the cam follower is detecting a cam, the projecting components like for example the bottom blades are so arranged that the closure cover cannot be opened or closed.

Furthermore a preferred embodiment provides that the positioning device is of such a configuration that it can control and stop the rotary movement of the mixer shaft and/or the rotary movement of the mixing container.

If therefore the emptying opening is to be opened or closed the positioning device is capable of so positioning the mixer shaft that harmless pivotal movement of the closure cover is possible. It can also ensure that that state is maintained during the opening or closing procedure.

Further advantages, features and possible uses of the present invention will be apparent from the description hereinafter of a preferred embodiment and the accompanying Figures in which:

FIGS. 1 and 2 show a structure from the state of the art, that has already been described hereinbefore.

FIG. 3 shows a diagrammatic sectional view of an embodiment according to the invention of the mixing device.

Figure 1:
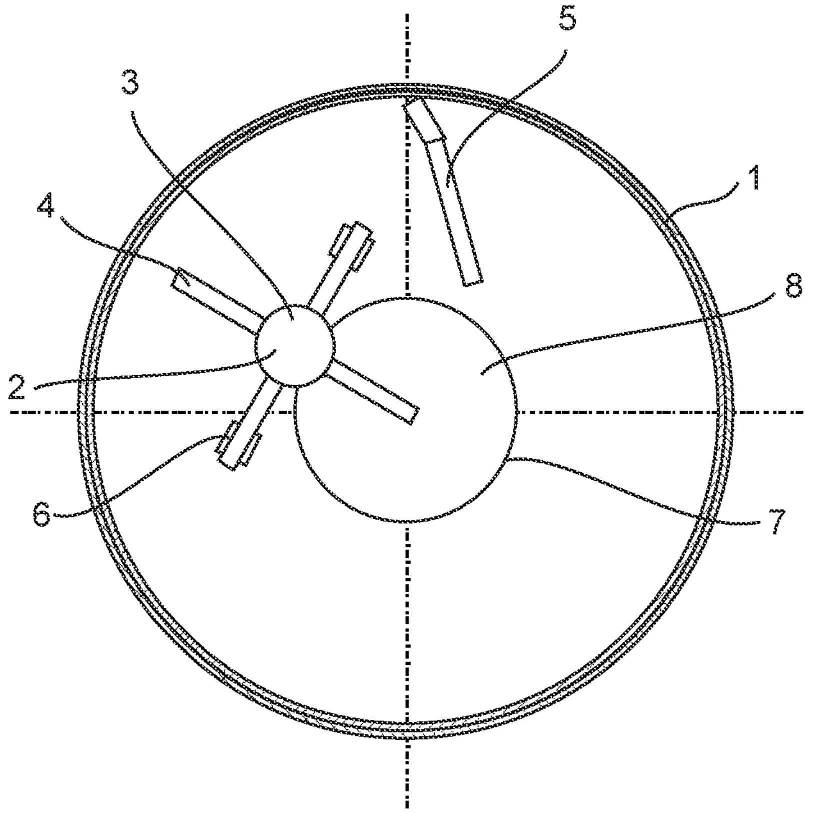
Fig. 1 Prior Art
FIG. 1 shows a plan view of a mixing container of the state of the art.
Figure 2:
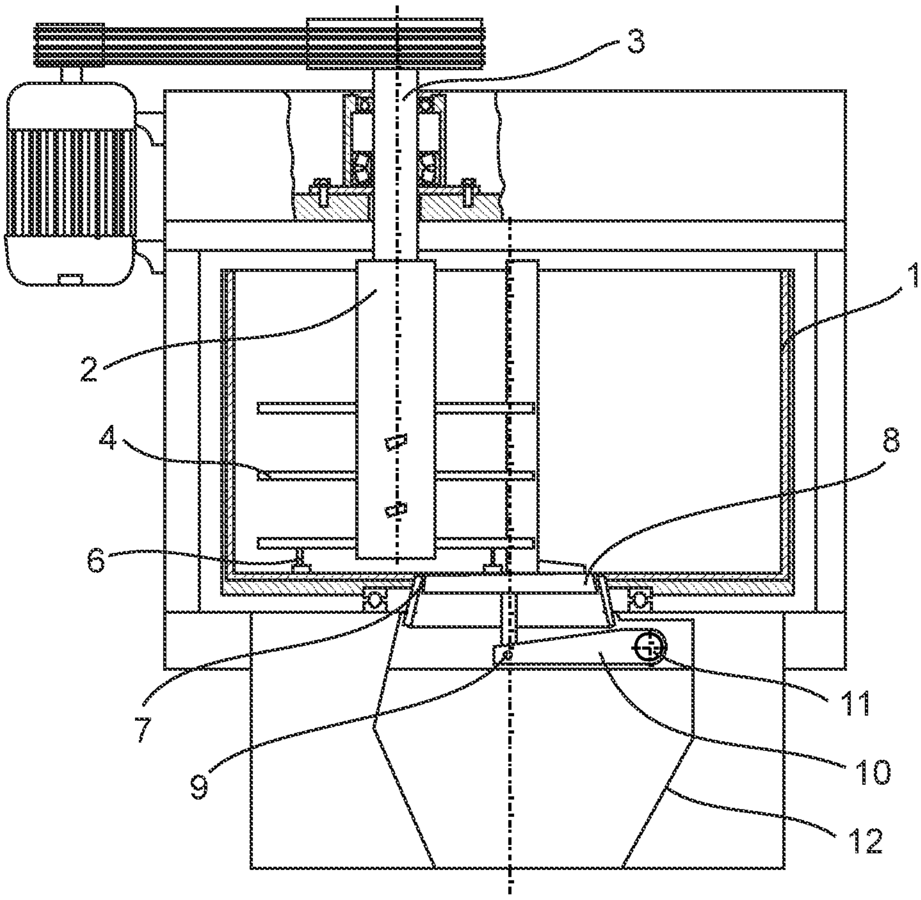
Fig. 2 Prior Art
FIG. 2 shows a lateral section through the mixing device and the mixing container fitted therein as shown in FIG. 1.

As far as possible the same reference numerals are used for the same elements. Here too there is a cylindrical mixing container 1 rotatable about an axis of rotation. A mixing tool having a mixing shaft 3 is arranged in the interior of the mixing container 1. Fixed to the mixing shaft 3 is a disc-shaped mixing tool 19 with axially upwardly projecting pins and with bottom blades 6 projecting in the direction of the container bottom.

The mixing shaft 3 is driven by a motor 21 by way of a V-belt. For that purpose a V-belt pulley 16 is fixed to the mixing shaft 3. Arranged on the V-belt pulley 16 are magnets 17 which can be detected with a suitable sensor 18. In the illustrated example the magnets 17 are arranged in the same plane in which both the axis of rotation of the mixing shaft 3 and also the bottom blade 6 are arranged.

Figure 3:
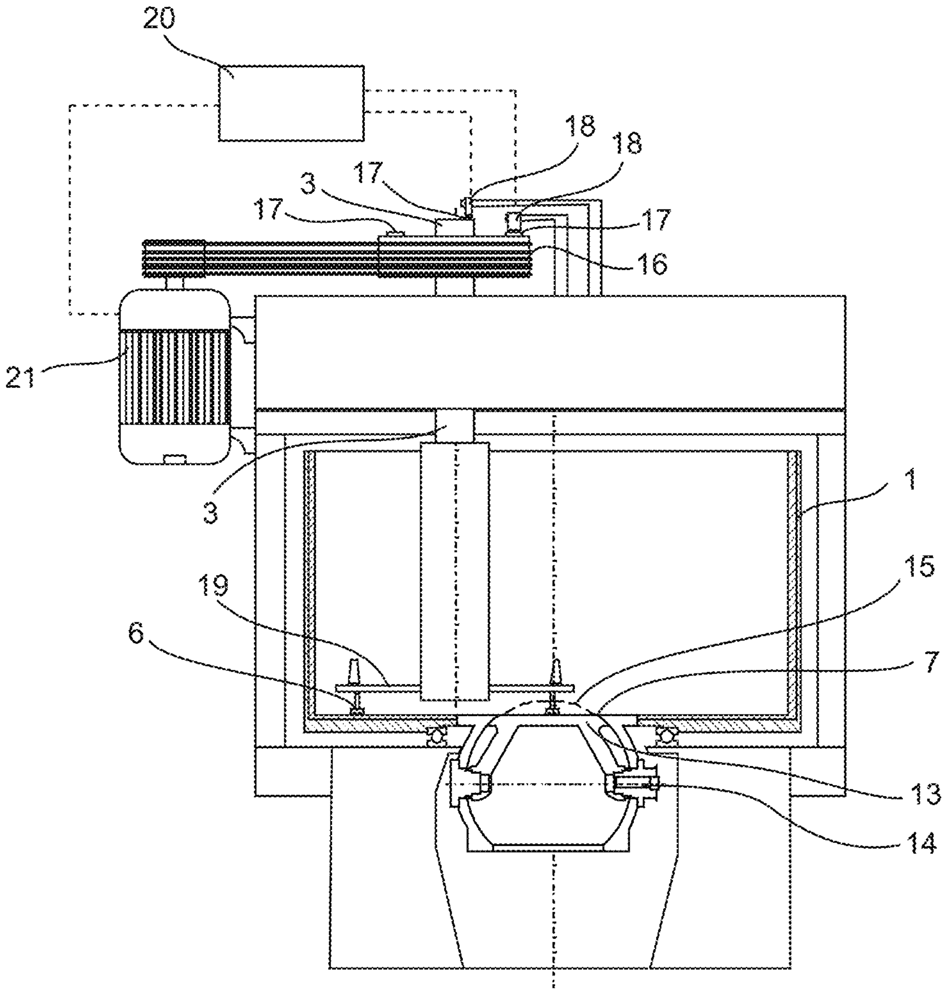
FIG. 3 shows an embodiment according to the invention of a mixing device.

As also shown by way of example in FIG. 3 the corresponding magnets 17 can also be arranged directly on the mixing shaft 3. The sensors 18 are read by a controller 20 which in turn drives the motor 21.

The container bottom has an emptying opening 7. A closure cover 13 is arranged in the emptying opening 7. The closure cover 13 and the emptying opening 7 have mutually corresponding edge surfaces which come into contact with each other when the closure cover is positioned in the emptying opening 7 as shown in FIG. 3. It will be seen that the closure cover 13 ends flush with the bottom of the container so that this affords a flat bottom surface.

The edge surfaces of the closure cover 13 are of a curved configuration such that they lie on a notional sphere. The closure cover 13 can be pivoted about a pivot axis 14 for opening and closing the emptying opening 7. The centre point of the notional sphere is on the pivot axis 14. The consequence of this is that the closure cover 13 can be pivoted about the pivot axis 14 without having to be previously moved out of the emptying opening 7. In that case the edge surfaces of the closure cover 13 move on the notional sphere 15. FIG. 3 shows a situation in which the closure cover 13 would collide with a bottom blade 6 in a pivotal movement about the pivot axis 14.

Therefore, before the closure cover 13 is pivoted about the pivot axis 14, the position of the mixing shaft 3 is detected by way of the magnets 17 and the sensors 18 and the movement of the mixing shaft 3 is controlled in such a way that the bottom blades 6 are moved out of the region of the pivotal movement of the closure cover 13 so that the closure cover 13 can then be opened or closed without any risk. Instead of the magnets 17 and the sensors 18, as already described hereinbefore, it would also be possible to fit suitable cams and cam followers or any other sensors and corresponding counterpart members which make it possible to detect the rotational position of the shaft.

The invention claimed is:

1. A mixing device having a container rotatable about a container axis for receiving mixing material, with an emptying opening being arranged in the bottom thereof, a rotatable mixing tool arranged in the interior of the container, and a closure element for closing the emptying opening, wherein the closure element can be pivoted about a pivot axis for opening and closing the emptying opening, wherein the closure element has an inner surface which with the emptying opening closed is arranged within the container, an outer surface which with the emptying opening closed is arranged outside the container, and an edge surface which with the emptying opening closed is arranged opposite an edge surface of the emptying opening, wherein the closure element, the emptying opening and the pivot axis are of such a configuration and arrangement that a point arranged furthest away from the pivot axis on the inner surface or the edge surface of the closure element describes a circle in the pivotal movement, wherein the closure element is arranged within the circle and the edge surfaces of the emptying opening are arranged outside the circle, wherein the emptying opening and the closure element have mutually corresponding edge surfaces which come into contact with each other when the closure element is positioned in the emptying opening, wherein the closure element ends flush with the bottom so that a flat bottom surface is afforded when the closure element is positioned in the emptying opening, wherein the mixing tool has a mixer shaft arranged parallel to the axis of rotation of the container and a positioning device for rotational positioning of the mixer shaft relative to the emptying opening, wherein the positioning device has a device for determining the rotational position of the mixer shaft, and wherein the device for determining the rotational position of the mixer shaft has cams arranged on the mixer shaft or on drive elements fixed thereto, and cam followers co-operating with the cams.

2. The mixing device according to claim 1, wherein the mixing tool has at least one bottom blade or mixing element projecting in the direction of the container bottom.

3. The mixing device according to claim 1, wherein the positioning device is of such a configuration that it can stop the rotary movement of the mixer shaft and/or the rotary movement of the mixing container.

4. The mixing device according to claim 1, wherein the closure element is in the form of a closure cover.

5. A mixing device having a container rotatable about a container axis for receiving mixing material, with an emptying opening being arranged in the bottom thereof, a rotatable mixing tool arranged in the interior of the container, and a closure element for closing the emptying opening, wherein the closure element can be pivoted about a pivot axis for opening and closing the emptying opening, wherein the closure element has an inner surface which with the emptying opening closed is arranged within the container, an outer surface which with the emptying opening closed is arranged outside the container, and an edge surface which with the emptying opening closed is arranged opposite an edge surface of the emptying opening, wherein the closure element, the emptying opening and the pivot axis are of such a configuration and arrangement that a point arranged furthest away from the pivot axis on the inner surface or the edge surface of the closure element describes a circle in the pivotal movement, wherein the closure element is arranged within the circle and the edge surfaces of the emptying opening are arranged outside the circle, wherein the emptying opening and the closure element have mutually corresponding edge surfaces which come into contact with each other when the closure element is positioned in the emptying opening, wherein the closure element ends flush with the bottom so that a flat bottom surface is afforded when the closure element is positioned in the emptying opening, and wherein the edge surfaces of the closure element are of a curved configuration such that they lie on a notional sphere and the centre point of the notional sphere lies on the pivot axis.

6. A mixing device having a container rotatable about a container axis for receiving mixing material, with an emptying opening being arranged in the bottom thereof, a rotatable mixing tool arranged in the interior of the container, and a closure element for closing the emptying opening, wherein the closure element can be pivoted about a pivot axis for opening and closing the emptying opening, wherein the closure element has an inner surface which with the emptying opening closed is arranged within the container, an outer surface which with the emptying opening closed is arranged outside the container, and an edge surface which with the emptying opening closed is arranged opposite an edge surface of the emptying opening, wherein the closure element, the emptying opening and the pivot axis are of such a configuration and arrangement that a point arranged furthest away from the pivot axis on the inner surface or the edge surface of the closure element describes a circle in the pivotal movement, wherein the closure element is arranged within the circle and the edge surfaces of the emptying opening are arranged outside the circle, wherein the emptying opening and the closure element have mutually corresponding edge surfaces which come into contact with each other when the closure element is positioned in the emptying opening, wherein the closure element ends flush with the bottom so that a flat bottom surface is afforded when the closure element is positioned in the emptying opening, and wherein the pivot axis of the closure element is arranged below the container and/or perpendicular to the container axis.

* * * * *